US005776555A

United States Patent [19]

Wagland et al.

[11] Patent Number: 5,776,555

[45] Date of Patent: Jul. 7, 1998

[54] PROCESS FOR THE METALLIZATION OF PHOSPHOR SCREENS

[75] Inventors: Alison Mary Wagland, Cumnor Hill; Karen Savill, Erskine; Warren Li, Reading; Jason Robert Brewer, Bracknell; Brian John Collister, Witney, all of United Kingdom

[73] Assignee: Cookson Group PLC, London, United Kingdom

[21] Appl. No.: 849,430

[22] PCT Filed: Nov. 27, 1995

[86] PCT No.: PCT/GB95/02762

§ 371 Date: May 29, 1997

§ 102(e) Date: May 29, 1997

[87] PCT Pub. No.: WO96/17370

PCT Pub. Date: Jun. 6, 1996

[30] Foreign Application Priority Data

Nov. 30, 1994 [GB] United Kingdom .................. 9424163

[51] Int. Cl.[6] ................................ B05D 5/06; C07F 2/46

[52] U.S. Cl. ............................ 427/487; 427/64; 427/68; 427/226; 427/508; 427/404; 427/407.1; 427/407.2

[58] Field of Search .............................. 427/64, 68, 487, 427/588, 226, 404, 407.1, 407.2

[56] References Cited

U.S. PATENT DOCUMENTS

| | | | |
|---|---|---|---|
| 4,122,213 | 10/1978 | Ito et al. | 427/64 |
| 4,165,396 | 8/1979 | Calamari | 427/64 |
| 4,327,123 | 4/1982 | Levine et al. | 427/64 |
| 4,517,224 | 5/1985 | Ditty | 427/64 |
| 4,954,366 | 9/1990 | Pezzulo | 427/64 |
| 5,145,511 | 9/1992 | Patel et al. | 427/64 |
| 5,208,065 | 5/1993 | Osaka et al. | 427/64 |

*Primary Examiner*—Janyce Bell
*Attorney, Agent, or Firm*—Mintz, Levin, Cohn, Ferris, Glovsky and Popeo, P.C.

[57] ABSTRACT

A process for the metallization of a phosphor screen which process comprises the steps of: i)applying to a process screen a coating composition comprising a poly(acrylate) or poky(methacrylate) dissolved in an acrylate or methacrylate monomer, the said composition including an initiator therein; ii) subjecting the coated to irradiation in order to form a polymeric film coating, iii)depositing a layer of metal upon the coated screen to form a composite; and iv) heating the composite to a temperature above the decomposition temperature of the film coating in order to decompose and/or volatilize the polymeric film coating.

13 Claims, No Drawings

PROCESS FOR THE METALLIZATION OF PHOSPHOR SCREENS

The present invention relates to a process for the metallization of phosphors screens and, in particular, phosphor screens for cathode ray tubes.

The electron permeable, light reflecting aluminium film on the target side of the phosphor screen of a CRT is formed by the evaporation of aluminium onto a smooth film of an organic material formed over the surface of a phosphor screen. This smooth film is subsequently burnt out to leave a mirror-like film of aluminium "tenting" across the top of the phosphor screen.

Various processes for metallizing phosphor screens have been proposed in the prior art and these can generally be classified as solvent based systems and aqueous based systems.

In the solvent based system, the phosphor layer is first wetted with an aqueous based prewet and a solvent based lacquer, comprising an approximately 2% solution of a polymer such as poly(iso-butyl methacrylate) in a solvent such as toluene, is floated on the top of the prewet. The water and solvent are removed by heating leaving a film of the polymeric material approximately 1 μm in thickness.

The major disadvantage of this approach is that it involves the use of large quantities of volatile organic solvents, such as toluene, with all the associated environmental concerns.

Aqueous based systems are described in U.S.Pat. No. 3,067,055, U.S. Pat. No. 3,582,389 and U.S. Pat. No. 3,582,390 in which a water-based emulsion of a water insoluble, film forming resin such as an acrylate resin copolymer is coated onto the phosphor screen, the coating is dried, the coated layer is metallized, and the coating of the resin film volatilized by heating at a temperature of up to about 450° C. The emulsion contains about 5 to 20 weight percent of the resin. In U.S. Pat. No. 3,582,389, the addition of materials to the dispersion is described. A neutralising agent is added to adjust the pH of the dispersion to the range of 4.0 to 8.0. A boric acid complex of poly(vinylalcohol) in an amount of up to 1.0% is added to reduce the blistering of the metal film over bare glass during the baking out step. Colloidal silica, in amounts of up to 25% and soluble silicates, in amounts of up to 2% are added to improve the adherence of the metallized layer to the glass and thereby reduce peeling of the metallized layer subsequent to the baking out step. In U.S. Pat. No. 4,123,563, the addition of ammonium oxalate is described to regulate the porosity of the polymer film and the metal layer. This prevents blisters on the metal film caused by the evaporation of the polymer layer. Similarly, U.S. Pat. No. 3,582,390 describes the use of hydrogen peroxide for the same purpose. In the latter U.S. Pat. No. 3,582,390 hydrogen peroxide is added to the emulsion, whereby it is stated that the tendency of the metal layer to blister over the phosphor screen area during the baking-out step is reduced.

One disadvantage of the aqueous based system is that the dispersion fills all of the spaces between the phosphor strips or dots and is thus a thicker layer than in the solvent based system. Accordingly, the amount of polymer left on the screen is greater than that utilized in solvent based processes and is therefore more difficult to remove. Consequently, increased energy requirements may result from the application of extended or even multiple burn out steps.

In the solvent based system as described generally above, the polymer film solution and the aluminium are applied to the phosphor screen and then the funnel of a CRT is attached to the screen with a glass frit in an organic binder. It is possible to remove both the polymer film and the organic binder in one heating cycle.

In the aqueous based systems the quantities of polymer to be removed are such as to generally necessitate the bake out of the polymer film before the addition of the funnel of a CRT. Therefore two heating cycles are required with increased energy costs, and greater investment required in the number of ovens and thus also the space required on the manufacturing site.

Another approach described in the prior art for metallizing phosphor screens is described in DE-A-4136310. In the method as disclosed a film layer composition is used which contains at least one of acrylate, vinyl or diazo functional groups. The composition comprises an initiator which is able to generate radicals when exposed to ultraviolet or electron beam radiation. The coatings produced from these compositions leave unacceptably high levels of residues after the sealing/heating cycle is complete.

We have now developed a process for the metallization of phosphor screens which is more energy efficient than the prior art methods, which uses a coating composition which does not contain any volatile organic solvents and which will be burned off during the heating cycle to leave little or no residue.

Accordingly, the present invention provides a process for the metallization of a phosphor screen which process comprises the steps of:

i) applying to a phosphor screen a coating composition comprising a poly(acrylate) or poly(methacrylate) dissolved in an acrylate or methacrylate monomer, the said composition including an initiator therein;

ii) subjecting the coated screen to irradiation in order to form a polymeric film coating;

iii) depositing a layer of metal upon the coated screen to form a composite; and iv) heating the composite to a temperature above the decomposition temperature of the film coating in order to decompose and/or volatilise the polymeric film coating.

The phosphor screens which are metallized in accordance with the process of the present invention are generally used in the formation of cathode ray tubes, such as colour television picture tubes or display tubes. At least one and preferably three patterns of successively deposited red-emitting, green-emitting and blue-emitting phosphor strips or dots are arranged in a predetermined pattern on the innersurface of a glass panel to form a luminescent phosphor screen.

In accordance with the method of the present invention the phosphor screen is coated with a coating composition comprising a poly(acrylate) or poly(methacrylate) dissolved in an acrylate or methacrylate monomer, the composition including an initiator therein so that on irradiation a polymeric coating is formed as the composition is cured.

The poly(acrylate) or poly(methacrylate) used in the coating composition comprises repeating units of the general formula:

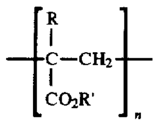

Wherein n is an integer of from 2 to 200,000

R is a hydrogen atom or a methyl group; and

R' is a $C_{1-18}$ alkyl group, an aryl group, or a cycloalkyl, cycloalkene, cycloalkyne, alkene, alkyne or heterocyclic group containing up to 20 carbon atoms, optionally substituted with one or more nitro, amine, hydroxy, alkoxy,nitrile and/or epoxy groups.

Examples of poly(acrylates) and poly(methacrylates) for use in the present invention are poly(ethyl methacrylate), poly(n-propyl methacrylate), poly(n-butyl methacrylate), poly(isobutyl methacrylate), poly(n-hexyl methacrylate), poly(n-octyl methacrylate), poly(2-ethylhexyl methacrylate), poly(isodecyl methacrylate), poly(n-dodecyl methacrylate), poly(n-tetradecyl methacrylate), poly(n-hexadecyl methacrylate), poly(n-octadecyl methacrylate), poly(iso-bornyl methacrylate), poly(bornyl methacrylate), poly(t-butyl methacrylate), poly(amyl methacrylate), poly (isoamyl methacrylate), poly(cyclohexyl methacrylate), poly(ethyl acrylate), poly(n-propyl acrylate), poly(n-butyl acrylate), poly-(isobutyl acrylate), poly(n-hexyl acrylate), poly(n-octyl acrylate), poly(2-ethyl hexyl acrylate), poly-(isodecyl acrylate), poly(n-dodecyl acrylate), poly(n-tetradecyl acrylate), poly((n-hexadecyl acrylate), poly(n-octadecyl acrylate), poly(isobornyl acrylate), poly(bornyl acrylate),. poly(t-butyl acrylate), poly(amyl acrylate), poly (isoamyl acrylate), poly(cyclohexyl acrylate), poly(n-heptyl acrylate), poly(n-nonyl acrylate), poly(secbutyl acrylate), poly(2-ethoxyethyl methacrylate), poly(2-hydroxyethyl methacrylate) or poly(tetrahydrofurfuryl methacrylate).

In the poly(acrylates) and poly(methacrylates) used in the present invention n is preferably an integer of from 1000 to 10,000.

The acrylate or methacrylate monomer used in the coating compositions is a compound of the general formula:

$RCH{=}CHCO_2R$ where R and R' are as above defined. Examples of the acrylate or methacrylate monomer for use in the present invention are methyl methacrylate, ethyl methacrylate, n-propyl methacrylate, n-butyl methacrylate, isoboryl methacrylate, n-hexyl methacrylate, n-octyl methacrylate, 2-ethyl hexyl methacrylate, isodecyl methacrylate, n-dodecyl methacrylate, n-tetradecyl methacrylate, n-hexadecyl methacrylate, n-octadecyl methacrylate, isobornyl methacrylate, bornyl methacrylate, t-butyl methacrylate, amyl methacrylate, isoamyl methacrylate, cyclohexyl methacrylate, methyl acrylate, ethyl acrylate, n-propyl acrylate, n-butyl acrylate, isobutyl acrylate, n-hexyl acrylate, n-octyl acrylate, 2-ethyl hexyl acrylate, isodecyl acrylate, n-dodecyl acrylate, n-tetradecyl acrylate, n-hexadecyl acrylate, n-octadecyl acrylate, isobornyl acrylate, bornyl acrylate, t-butyl acrylate, amyl acrylate, isoamyl acrylate, cyclohexyl acrylate, n-heptyl acrylate, n-nonyl acrylate, sec-butyl acrylate, 2-ethoxyethyl methacrylate, 2-hydroxyethyl methacrylate or tetrahydrofurfuryl methacrylate.

The coating compositions used in the method of the present invention will generally comprise from 0.1 to 20%, more preferably from 5 to 12%, by weight of the poly (acrylate) or poly(methacrylate), from 70 to 99.8%, more preferably from 80 to 95%, by weight of the monomer and from 0.1 to 10%, more preferably from 1 to 5% by weight of an initiator.

The coating composition is generally prepared by dissolving the poly(acrylate) or poly(methacrylate) resin in the acrylate or methacrylate monomer and then adding the initiator. Alternatively, addition of an initiator to the acrylate or methacrylate monomer can take place, followed by subsequent addition of poly(acrylate) or poly(methacrylate). The initiator must be capable of generating radicals or cations on exposure to irradiation, for example ultraviolet, electron beam, thermal, visible, microwave or gamma radiation.

The initiator may be at least of the general type: benzoin ethers, e.g. 2-ethoxy-1,2-diphenylethanone; benzilketals, e.g. 2,2-dimethoxy-1,2-diphenylethanone; dialkoxyacetophenone, e.g. diethoxy-1-phenylethanone; hydroxyalkylphenones, e.g. hydroxycyclohexylphenylketone; thioxanthone derivatives; aminoalkylphenones, e.g. bis(2-methyl-2-morpholinopropanoyl)-9-butyl carbazole; acylphosphine oxides; halogenated compounds, e.g. phenyltribromoethylsulphone; benzophenone derivatives, e.g. Michlers ketone; diketones, e.g. benzil; water soluble initiators, e.g. benzoyl-N,N,N-trimethylbenzene, ammonium chloride, potassium persulphate; amine coinitiators, e.g. methyldiethanolamine; triaryl sulphonium salt; diaryl iodonium salt, peroxide; peroxy ester; hydroperoxide; azo-initiator; peroxycarbonate; perketal; or mixtures of any of the above.

The phosphor screen is coated with the coating composition by techniques known in the art. For example, the coating composition may be coated onto a rotating phosphor screen, optionally with tilting of the screen in order to spin off excess coating composition. The coating composition will generally be coated onto the phosphor screen in a thickness of up to 25 μm. It may be advantageous to pre-wet the phosphor screen prior to application of the coating in order to ensure uniformity of the coating on the phosphor screen. The coating composition used in the process of the present invention may include up to 10% by weight of a levelling agent, for example a polyether modified polydimethylsiloxane or a nitrated cellulose ester.

After the phosphor screen has been coated with the coating composition the coating is subjected to irradiation in order to generate free radicals or cations and cure the film. The irradiation may be by ultraviolet, electron beam, thermal, visible, microwave or gamma radiation, with the dosage being sufficient to initiate cure of the coating composition. The coated screen may then be heated in order to remove any water remaining from the prewetting solution.

The prewetting solution may contain thickening agents such as acrylic copolymers (Rheovis range, Allied Colloids), polyacrylic acid (Viscalex range, Allied Colloids), hydrous sodium lithium magnesium silicate (Laponite, Laporte adsorbents). Glycerol may also be used as an additive in the prewetting solution.

A metal layer is then deposited onto the coated screen according to techniques known in the art. For the production of CRTs the metal layer is aluminium which is preferably deposited onto the phosphor screen by vacuum evaporation. The aluminium layer preferably has a thickness in the range of from 0.1 to 0.3 μm.

After the metal layer has been deposited onto the phosphor screens to form a composite, the composite is then heated to a temperature above the decomposition temperature of the polymeric film coating in order to burn out and volatilize the polymer. The polymeric film coating decomposes on heating to leave minimal residue. The most preferred polymeric film coatings for use in the present invention volatilise or decompose at a temperature of below about 450° C.

In putting the process of the present invention into practice, the heating of the composite in step (iv) may be combined with the step of sealing a cathode ray tube to the phosphor screen, i.e. a separate baking step to volatilise the polymeric film coating becomes unnecessary. The sealing of a cathode ray tube to a metallized phosphor screen is well known in the art, the seal generally being effected by using a frit sealing process in which a glass frit in an organic binder is used to seal the components together. The oxygen which is present in the cathode ray tube is generally sufficient to assist in the burn out of the polymeric film coating, although it will be understood that additional air or oxygen-enriched air may be introduced into the cathode ray tube, as necessary. The frit sealing of the metallized phosphor screen to the cathode ray tube will generally occur at a temperature of about 450° C. The conventional temperature profile for the sealing cycle is termed a Lehr cycle.

The present invention includes within its scope a phosphor screen which has been metallised by the process of the invention and a cathode ray tube which includes at least one phosphor screen which has been metallized by the process of the invention.

The present invention will be further described with reference to the following Examples in which the following definition is used.

Lehr Cycle

The Lehr cycle used in the following Examples was as follows: heat from room temperature to 450° C. at 10° C./min, hold at 450° C. for 45 minutes and then cool to room temperature.

EXAMPLE 1

A prewetted TV screen was spray coated with a UV curable lacquer comprising isobutyl methacrylate (89 wt %), poly(isobutyl methacrylate) (10 wt %) and 1% of 2-benzyl-2-dimethylamino-1-(4-morpholinophenyl)-butan-1-one commercially available as Irgacure 369—Ciba Giegy). Excess lacquer was removed by spinning at 160 rpm for 20 seconds.

The UV curable lacquer was then cured by irradiation with a Fusion DRSE 120 UV source equipped with two 600W/in H bulbs set at high power. Two passes through the instrument at a belt speed of 10 m/min ensured that the sample was completely cured and non tacky after cooling below the glass transition temperature of the polymer.

The TV screen was then aluminised by vapour phase deposition, using a technique known to those skilled in the art. The instrument employed was an Edwards E 306A Coating System operating at a vacuum of $10^{-5}$ mbar. The aluminium film was shiny and metallic to the eye and did not transmit light on backlighting.

Finally the UV cured lacquer was heated under the conditions of the Lehr cycle. The aluminium film on the resultant screen was free of imperfections and blisters. Under backlighting, the appearance of the screen was unchanged except for pinholes caused by the volatilisation of the polymer film.

EXAMPLE 2

A prewetted TV screen was spray coated with a UV curable lacquer comprising methyl methacrylate (89 wt %), poly(methyl methacrylate) (10 wt %) and Irgacure 369 (1 wt %). Excess lacquer was removed by spinning at 160 rpm for 20 seconds.

The UV curable lacquer was then cured by irradiation with a Fusion DRSE 120 UV source equipped with two 600W/in H bulbs set at high power. Two passes through the instrument at a belt speed of 10 m/min ensured that the sample was completely cured and non tacky after cooling below the glass transition temperature of the polymer.

The TV screen was then aluminised according to Example 1. The resultant aluminium film was shiny and metallic to the eye and did not transmit light on backlighting.

Finally, the UV cured lacquer was burnt out by heating the sample at 10° C./min to 450° C. followed by a 45 minute iosthermal hold to give a screen where the aluminium layer adhered to the phosphors and was shiny in appearance.

EXAMPLE 3

A prewetted TV screen was spray coated with a UV curable lacquer comprising 2-ethoxyethyl methacrylate (89 wt %), poly(isobutyl methacrylate) (10 wt %) and Irgacure 369 (1 wt %). Excess lacquer was removed by spinning at 160 rpm for 20 seconds.

The UV curable lacquer was then cured by irradiation with a Fusion DRSE 120 UV source equipped with two 600W/in H bulbs set at high power.

The TV screen piece was then aluminised according to Example 1. The resultant aluminium film was shiny and metallic to the eye and did not transmit light on backlighting.

Finally, the UV cured lacquer was heated under the conditions of the Lehr cycle. The adherent aluminium film on the resultant screen was shiny in appearance.

EXAMPLE 4

A prewetted TV screen was spray coated with a formulation comprising poly(isobutyl methacrylate) (7.5 wt %), isobutyl methacrylate (85.5 wt %), 1-hydroxycyclohexylphenylketone, commercially available as Irgacure 184, Ciba-Giegy (5wt %) and 2wt % of Quantacure ITX (a blend of 2- and 4-isopropyl-thioxanthones—Great Lakes Fine Chemicals Ltd). The TV screen was cured under a medium pressure mercury lamp for 10 minutes until tack free and then aluminised according to the method of Example 1.

The screen was then heated under the conditions of the Lehr cycle. The resultant aluminium film on the cooled screen was metallic in appearance and visually free from cracks or blisters.

EXAMPLE 5

Poly(ethyl methacrylate) (4 wt %) was dissolved in isobutyl methacrylate (91 wt %). To this solution was added cyclohexyl phenyl ketone (5 wt %). The whole mixture was stirred for 14 hours at room temperature until a homogenous solution was obtained.

The resulting film layer composition was spin coated onto a prewetted phosphor TV screen. The composition was exposed to ultraviolet radiation produced by a medium pressure mercury lamp. After about 4 minutes, all the resin constituents of the film layer composition were cured and produced a translucent layer. This panel was then dried by placing it in an oven at 120° C. for 5 minutes. Aluminium was then deposited by the method of Example 1.

The screen was heated under the conditions of the Lehr cycle to leave an aluminium film adhering to the phosphors.

EXAMPLE 6

Poly(isobutyl methacrylate)(4 wt %) was dissolved in isobutyl methacrylate (91 wt %) over a 14 hour period. Lauroyl peroxide (5 wt %), a thermal initiator, was then added to this film forming composition and the mixture was stirred for a further 2 hours at room temperature.

The resulting film layer composition was spin coated onto a prewetted phosphor TV screen. The coated TV screen was then placed in an oven at 70° C. for 15 minutes to cure the composition and leave a polymer coating over the surface of the phosphors.

Aluminium was deposited by the method of Example 1. The resultant screen was heated under the conditions of the Lehr cycle to leave an aluminium film adhering to the phosphors.

We claim:

1. A process for the metallization of a phosphor screen which process comprises the steps of:

i) applying to a phosphor screen a coating composition comprising a poly(acrylate) or poly(methacrylate) dissolved in an acrylate or methacrylate monomer, the said composition including an initiator therein;

ii) subjecting the coated screen to irradiation in order to form a polymeric film coating;

iii) depositing a layer of metal upon the coated screen to form a composite; and iv) heating the composite to a temperature above the decomposition temperature of the film coating in order to decompose and/or volatilise the polymeric film coating.

2. A process as claimed in claim 1 wherein the polyacrylate or poly(methacrylate) comprise repeating units of the general formula:

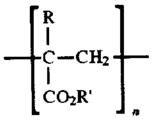

Wherein n is an integer of from 2 to 200,000

R is a hydrogen atom or a methyl group; and

R' is a $C_{1-18}$ alkyl group, an aryl group, or a cycloalkyl, cycloalkene, cycloalkyne, alkene, alkyne or heterocyclic group containing up to 20 carbon atoms, optionally substituted with one or more nitro, amine, hydroxy, alkoxy, nitrile and/or epoxy groups.

3. A process as claimed in claim 1 wherein the poly (methacrylate) is poly(methyl methacrylate), poly(ethyl methacrylate), poly(isobutyl methacrylate), poly(n-butyl methacrylate) or poly (isobornyl methacrylate).

4. A process as claimed in claim 1, wherein the acrylate or methacrylate monomer is a compound of the general formula:

$$RCH{=}CHCO_2R$$

where R and R' are as defined in claim 2.

5. A process as claimed in claim 4 wherein the monomer is isobutyl methacrylate.

6. A process as claimed in claim 1 wherein the coating compositions comprises from 0.1 to 20% by weight of poly(acrylate) or poly(methacrylate), from 70 to 99.8% by weight of the acrylate or methacrylate monomer and from 0.1 to 10% by weight of an initiator.

7. A process as claimed in claim 1 wherein the initiator is at least one of a benzoin ether, benzilketal, dialkoxyacetophenone, hydroxyalkylphenone, thioxanthone derivative, amino-alkylphenone, acylphosphine oxide, halogenated compound, benzophenone derivative, diketone, water soluble initiator, amine coinitiator, triaryl sulphonium salt, diaryl iodonium salt, peroxide, peroxyl ester, hydroperoxide, azoinitiator, peroxycarbonate or perketal.

8. A process as claimed in claim 1, wherein the coated screen is subjected to irradiation which is ultraviolet, electron beam, thermal, visible, microwave or gamma radiation.

9. A process as claimed in claim 1 wherein the metal which is deposited upon the coated screen is aluminium.

10. A process as claimed in claim 9 wherein the layer of aluminium is deposited upon the coated screen by vacuum evaporation.

11. A process as claimed in claim 10 wherein the layer of aluminium has a thickness in the range of from 0.1 to 0.3 μm.

12. A process as claimed in claim 1 wherein the heating of the composite in step (iv) is effected during the sealing of a cathode ray funnel to the phosphor screen.

13. A process as claimed in claim 12 wherein the maximum temperature reached during the sealing step is about 450° C.

* * * * *